(12) United States Patent
Mihatsch et al.

(10) Patent No.: US 9,347,552 B2
(45) Date of Patent: May 24, 2016

(54) METHOD FOR OPERATING A TRANSMISSION DEVICE

(71) Applicant: ZF Friedrichshafen AG, Friedrichshafen (DE)

(72) Inventors: Georg Mihatsch, Lindau (DE); Patrick Riedel, Kressbronn (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 14/538,151

(22) Filed: Nov. 11, 2014

(65) Prior Publication Data

US 2015/0133252 A1    May 14, 2015

(30) Foreign Application Priority Data

Nov. 11, 2013    (DE) .......................... 10 2013 222 812

(51) Int. Cl.
| | |
|---|---|
| *F16H 61/00* | (2006.01) |
| *F16H 61/02* | (2006.01) |
| *F16H 61/06* | (2006.01) |
| *F16H 61/686* | (2006.01) |

(Continued)

(52) U.S. Cl.
CPC ........ *F16H 61/0265* (2013.01); *F16H 61/0204* (2013.01); *F16H 61/061* (2013.01); *F16H 3/66* (2013.01); *F16H 61/686* (2013.01); *F16H 2003/442* (2013.01); *F16H 2003/445* (2013.01);

(Continued)

(58) Field of Classification Search
CPC .. F16H 61/061; F16H 61/0021; F16H 61/065
See application file for complete search history.

(56) References Cited

U.S. PATENT DOCUMENTS

2011/0177913 A1*   7/2011   Pruski et al. .................. 477/180
2011/0251766 A1*  10/2011   Schang et al. .................. 701/67

(Continued)

FOREIGN PATENT DOCUMENTS

| DE | 10 2011109376 A1 | 2/2013 |
| DE | 10 2013/202708 A1 | 8/2014 |
| DE | 10 2013202707 A1 | 8/2014 |

OTHER PUBLICATIONS

German Search Report, Dated Nov. 11, 2013 (5 pages).

*Primary Examiner* — Tisha Lewis
(74) *Attorney, Agent, or Firm* — Dority & Manning, P.A.

(57) ABSTRACT

A method for operating a transmission device, which is transferable into different operating states through the actuation of shifting elements, is described. At least one of the shifting elements is designed as a positive-locking shifting element, which is supplied with operating pressure for presenting a defined operating state of the transmission device. Through a sensor device upstream of a valve device, which is connected to a transmission area essentially featuring ambient pressure, a value of a pressure signal corresponding to the operating pressure can be determined. Upon exceeding a threshold value of the pressure signal, currently in the area of the positive-locking shifting element, a change in operating state is determined, and, upon falling short of an additional threshold value of the pressure signal, the reaching of the requested operating state is established. In a non-actuated operating state of the positive-locking shifting element, the pressure in the transmission area is established by the sensor device. Upon the presence of a request for a change in operating state in the area of the positive-locking shifting element, the threshold value and the additional threshold value are determined from the sum of the pressure calculated in the transmission area prior to the presence of the request for the change in operating state and a pressure offset value.

11 Claims, 5 Drawing Sheets

(51) Int. Cl.
  *F16H 3/66*   (2006.01)
  *F16H 3/44*   (2006.01)
(52) U.S. Cl.
  CPC . *F16H 2200/0065* (2013.01); *F16H 2200/2012* (2013.01); *F16H 2200/2046* (2013.01); *F16H 2200/2064* (2013.01); *F16H 2200/2094* (2013.01)

(56) References Cited

U.S. PATENT DOCUMENTS

| | | |
|---|---|---|
| 2014/0157766 A1 | 6/2014 | Baraga et al. |
| 2014/0236438 A1 | 8/2014 | Arnold et al. |
| 2014/0236439 A1 | 8/2014 | Arnold et al. |

\* cited by examiner

METHOD FOR OPERATING A TRANSMISSION DEVICE

FIELD OF INVENTION

The invention relates generally to a method for operating a transmission device.

BACKGROUND

A method for operating a transmission device, in particular a nine-speed transmission, is known from the unpublished DE 10 2013 202 707.9 or the unpublished DE 10 2013 202 708.7 of the applicant, for which, through a sensor device upstream of a throttle device, which is connected to a transmission area essentially featuring ambient pressure, a value of a pressure signal corresponding to the operating pressure of a positive-locking shifting element of the transmission device can be determined. Upon exceeding a threshold value of the pressure signal, currently in the area of the positive-locking shifting element, a change in operating state is determined, and, upon falling short of an additional threshold value of the pressure signal, the reaching of the requested operating state is established.

The sensor device is designed as a so-called "absolute pressure sensor," through which the absolute value of the pressure signal can be determined, which value arises as a measured value from the sum of the existing ambient pressure and the relative amount of pressure resulting from the operating pressure applied at the positive-locking shifting element. Thereby, the relative amount of pressure is nearly constant during a change in operating state of the positive-locking shifting element, while the ambient pressure varies, depending on the operating state, due to the weather and depending on the current altitude currently traveled on by a vehicle designed with the transmission device. For this reason, the start of the change in operating state determined by the threshold value varies in the area of the positive-locking shifting element and the established point in time at which the positive-locking shifting element reaches the requested operating state. Therefore, depending on this, the functions of a transmission device that are carried out are initiated too late or too early, which, during unfavorable operating state curves, can adversely affect driving comfort.

As such, this invention is directed to a method that is able to be carried out with a low degree of control and adjusting effort for operating a transmission device, in particular a nine-speed transmission, with which a high degree of driving comfort is possible.

SUMMARY OF THE INVENTION

With the method in accordance with an exemplary embodiment of the invention for operating a transmission device, in particular a nine-speed transmission, which is transferable into different operating states through the actuation of shifting elements, whereas at least one of the shifting elements is designed as a positive-locking shifting element, which is supplied with operating pressure for presenting a defined operating state of the transmission device and is thereby transferred from a closed into an open operating state, or from an open into a closed operating state, whereas, through a sensor device upstream of a throttle device, which is connected to a transmission area essentially featuring ambient pressure, a value of a pressure signal corresponding to the operating pressure can be determined, upon exceeding a threshold value of the pressure signal, currently in the area of the positive-locking shifting element, a change in operating state is determined, and, upon falling short of an additional threshold value of the pressure signal, the reaching of the requested operating state is established.

In accordance with an exemplary embodiment of the invention, in a non-actuated operating state of the positive-locking shifting element, the pressure in the transmission area is established by the sensor device and, upon the presence of a request for a change in operating state in the area of the positive-locking shifting element, the threshold valve and the additional threshold value are determined from the sum of the pressure calculated in the transmission area prior to the presence of the request for the change in operating state and a pressure offset value.

Thus, the determination of whether a change in operating state is currently taking place in the area of the positive-locking shifting element and whether the positive-locking shifting element has reached the requested change in operating state is carried out depending on the currently existing ambient pressure, and a vehicle designed with a transmission device operating in accordance with an exemplar embodiment of the invention is operable in a simple manner with a high degree of driving comfort. The determination of whether a change in operating state in the area of the positive-locking shifting element is currently being carried out, and when or if the requested change in operating state is reached, is carried out by the approach in accordance with an exemplary embodiment of the invention depending on the currently existing ambient pressure, by which both the start of a change in operating state and the reaching of the requested change in operating state can be established more accurately when compared to previously applied approaches. Each additional actuating process carried out depending on this in the area of the transmission device and the vehicle can be operated to an extent necessary to achieve a high level of driving comfort.

Operating states with an undersupply in the area of a hydraulic control unit of a transmission device, for example, can also be avoided, with little effort, through an accurate knowledge of a current change in operating state taking place in the area of the positive-locking shifting element, which change is realized by means of a volume flow of hydraulic fluid provided by the transmission control unit, if, during such an operating phase of the transmission device, additional hydraulic consumers are provided or supplied only with a volume flow of hydraulic fluid that is adjusted to this or preferably reduced.

If the pressure offset values provided for the determination of the threshold values deviate from one another, hydraulic delays or flow resistances that deviate from each other (for example) may be taken into account in a simple manner in a line system of a hydraulic system of a transmission device supplying the positive-locking shifting element with operating pressure.

If the pressure offset values provided for the determination of the threshold values correlate with one another, the method in accordance with an exemplary embodiment of the invention can be carried out with little effort.

With an advantageous variation of the method in accordance with an exemplary embodiment of the invention, the pressure in the transmission area is determined in a non-actuated operating state of the positive-locking shifting element after the expiration of a period of time in the area of the sensor device that starts at a point in time at which the reaching of the requested operating state is established. This ensures in a simple manner that the determination of the pressure in the area of the sensor unit upstream of the throttle device is established during an essentially constant operating state curve of a hydraulic system supplying the positive-locking shifting element with operating pressure. The pressure in the transmission area determined by the sensor device is then essentially identical to the currently existing ambient pressure of the transmission device, since there is no influence on the measurement result by additional control and adjustment processes that take place in the area of the transmission device and take place depending on the hydraulic pressure supply.

The pressure in the transmission area is determined in the area of the sensor device in a non-actuated operating state of the positive-locking shifting element for the avoidance of unwanted distortions in the measuring signal of the sensor device, preferably upon the presence of an operating state of the transmission device, at which the pressure in the transmission area is essentially not affected by the presentation of the current operating state of the transmission device.

If the pressure offset values vary depending on at least one operating dimension of the transmission device, the determination of whether a change in operating state is currently taking place in the area of the positive-locking shifting element and whether the requested operating state has been reached in the area of the positive-locking shifting element can be carried out depending on the existing operating state with little effort.

With an additional advantageous variant, in a simple manner, the determination of whether a change in operating state has taken place in the area of the positive-locking shifting element and whether the positive-locking shifting element has reached the requested operating state is then carried out in a manner adjusted to the existing operating state of a transmission device, if the pressure offset values change depending on the transmission temperature and/or the system pressure of a hydraulic actuating system of the transmission device.

With an additional advantageous variant of the method in accordance with the an exemplary embodiment of invention, in particular after a restart of the transmission device upon the presence of a request for a change in operating state in the area of the shifting element, the pressure offset values are multiplied by a factor less than one, and are used to determine whether a change in operating state of the shifting element has taken place and has been completed. In a simple manner, this ensures that, in the hydraulic system, for example after long downtimes of a vehicle, existing air pockets that cause variations in the curve of the pressure signal dependent on the operating pressure do not cause faulty determinations of the current operating state of a positive-locking shifting element to be actuated.

If the factor originating from a start value of less than one gradually is raised by one value with each change in operating state of the positive-locking shifting element and/or additional shifting elements of the transmission device the option exists of, in a simple manner, determining and monitoring the current change in operating state in the area of the positive-locking shifting element and the reaching of a requested change in operating state with reduced pressure offset values until any air pockets from a hydraulic actuating system of a transmission device allocated to the positive-locking shifting element system are pumped out or exposed.

With an additional advantageous variant of the method in accordance with the an exemplary embodiment of invention, the factor is raised up to a value equal to one, by which impairments to the actuation of the positive-locking shifting element that might arise through air pockets can be avoided, and the monitoring of the positive-locking shifting element can be carried out according to defined, specifiable actuating cycles of the positive-locking shifting element, once again in normal operating mode.

In order to be able to take into account events, such as those after downtimes of varying lengths or after an oil change of the transmission, causing accumulations of air of varying sizes in the area of the hydraulic actuating system of the transmission device, the number of changes in operating states of the positive-locking shifting element and/or additional shifting elements of the transmission device originating from the start value of the factor less than one varies until reaching the value of the factor equal to one.

Both the characteristics specified in the claims and the characteristics specified in the subsequent embodiments of the object in accordance with the invention are, by themselves alone or in any combination with one another, suitable for providing additional forms of the object in accordance with the invention. In terms of the additional forms of the object in accordance with the invention, the particular combinations of characteristics do not represent a limitation; rather, they are essentially solely of an exemplary nature.

Additional advantages and advantageous embodiments of the invention arise from the claims and the embodiment described with reference to the drawing in terms of principle.

BRIEF DESCRIPTION OF THE DRAWINGS

The following is shown.

DETAILED DESCRIPTION

Figures 1, 2:
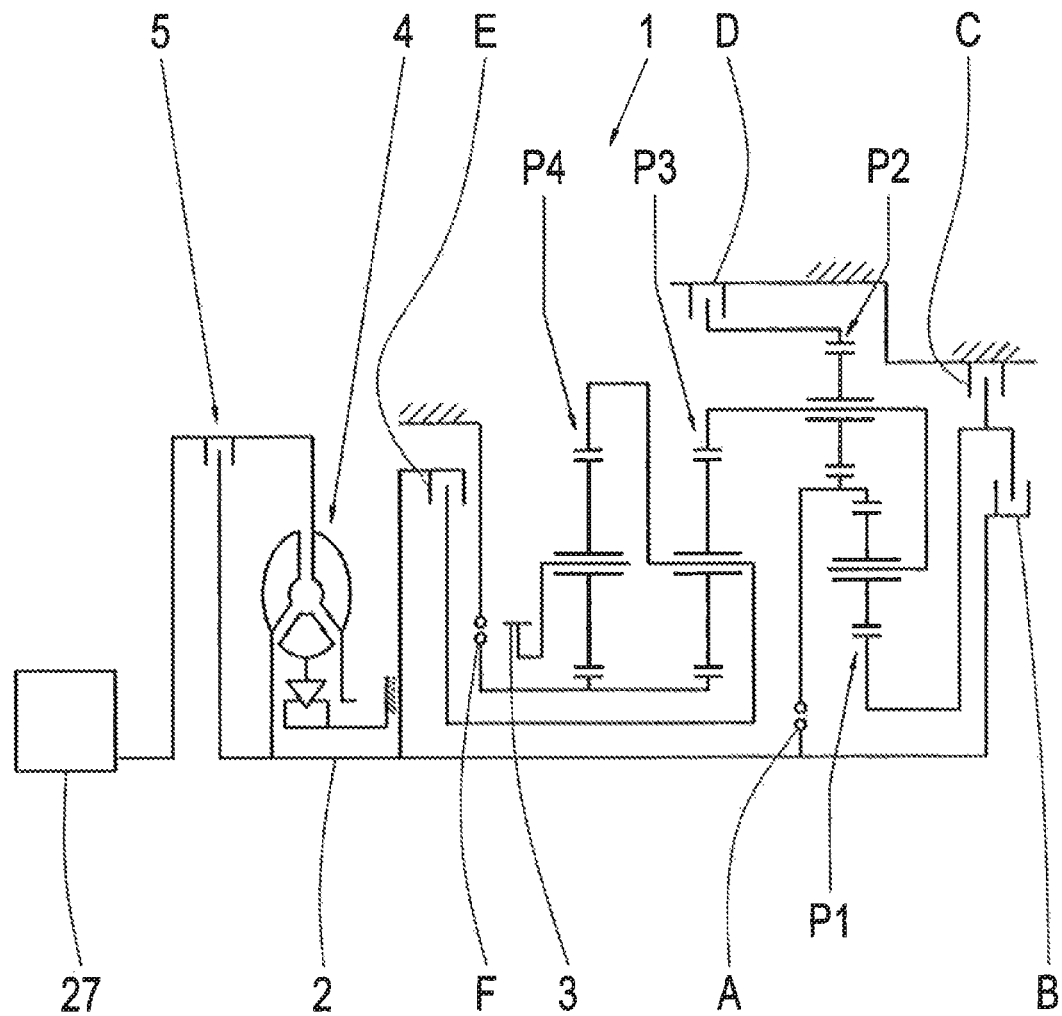
FIG. 1 a wheel set diagram of a transmission device.
FIG. 2 a shifting logic in tabular form of the transmission device shown in FIG. 1.

Reference will now be made to embodiments of the invention, one of more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a wheel diagram of a transmission device 1 or a nine-speed transmission, which is generally known from DE 10 2008 000 429 A1. The transmission device 1 comprises a transmission input shaft 2 and a transmission output shaft 3, which, in a state installed in a vehicle, is connected to an output of the vehicle, while the transmission input shaft 2 is in operative connection to a drive unit 27 through a hydrodynamic turning moment converter 4 and a torque converter lock-up clutch 5 assigned to the turning moment converter 4.

In addition, the transmission device 1 comprises four planetary gear sets P1 to P4, whereas the first and the second planetary gear sets P1, P2, which are preferably designed as minus gear sets, form a shiftable reduction gear set, while the third and the fourth planetary gear sets P3 and P4 represent the main wheel set. In addition, the transmission device 1 comprises six shifting elements A to F, whereof the elements C, D, and F are designed as brakes, and the shifting elements A, B and E are designed as shifting clutches.

With the shifting elements A to F, in accordance with the shifting logic shown in more detail in FIG. 2, a selective shifting of nine forward gears D1 to D9 and one reverse gear R is feasible, whereas, for the production of a power flow in the transmission device 1, essentially simultaneously, three shifting elements are led to or held in a closed operating state.

The shifting elements A and F are designed as positive-locking shifting elements without additional synchronization, in order to, in the operation of the transmission device 1, compared to transmission devices designed with only frictional-locking shifting elements, reduce drag torques caused by open frictional-locking shifting elements. Since, as a general rule, positive-locking shifting elements are transferable from an open operating state into a closed operating state only within a very narrow differential speed range around the synchronous speed, the synchronization of a positive-locking shifting element to be switched on is realized, without additional structural designs, through the corresponding actuation of the shifting elements participating in the gearshift. This applies to both traction gearshifts and to thrust gearshifts, whereas the positive-locking shifting elements can be designed as claw couplings, which are formed with or without additional synchronization.

Figure 3:
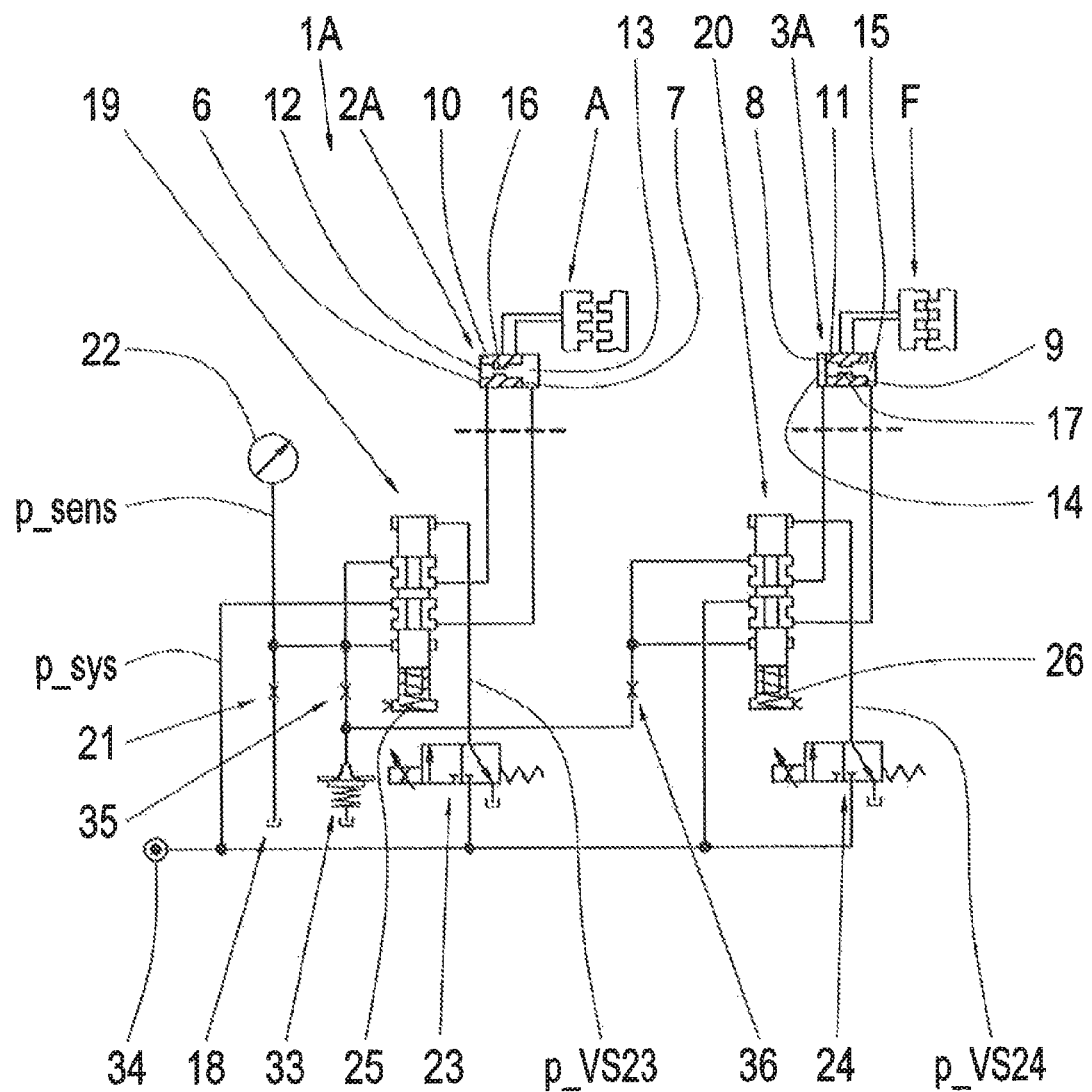
FIG. 3 a hydraulic diagram of a part of a hydraulic system of the transmission device in accordance with FIG. 1.

FIG. 3 shows a hydraulic diagram of a part of a hydraulic actuating system 1A of the transmission device 1, through which, among other things, each of the two positive-locking shifting elements A and F is able to be supplied with operating pressure, and through which an operating state of two bidirectionally actuated positioning devices 2A, 3A of the shifting elements (in this case, designed as claw shifting elements) can be determined. Each of the positioning devices 2A, 3A is able to be supplied with hydraulic pressure in the area of the effective surfaces 6, 7, or 8, 9, as the case may be, of a piston element 10, 11.

Upon the application of a hydraulic pressure p_sys of a high-pressure area 34 in the area of a first effective surface 6 or 8 at the piston element 10 or 11, a force component acting in the direction of a first end position of the piston element 10 or 11 is engaged. If, by contrast, the hydraulic pressure p_sys of the high-pressure area 34 applies at the second effective surface 7 or 9 of the piston element 10 or 11, a force component acting on the piston element 10 or 11 or acting in the direction of a second end position of the piston element 10 or 11 is engaged.

Areas 12, 13, or 14, 15, as the case may be, or piston chambers, which can be supplied with the hydraulic pressure p_sys of the high-pressure area 34 and are assigned to the effective surfaces 6, 7, or 8, 9, as the case may be, of the piston elements 10 or 11, are connected to each other in positions of the piston elements 10, 11 between their end positions, in each case by a throttle device 16 or 17. In addition, one of the areas 12 or 13, or 14 or 15, as the case may be, for the adjustment of a piston element 10 or 11, can be coupled to the high-pressure area 34, and the other area 13 or 12, or 15 or 14, as the case may be, can be coupled to a transmission area 18 or a low-pressure area essentially featuring ambient pressure. For this purpose, two valve devices 19, 20 are provided, in the areas of which the piston chambers 12, 13, or 14, 15, as the case may be, can be coupled to either the high-pressure area 34 or the low-pressure area 18.

An additional throttle device 21 is provided upstream of the low-pressure area 18 and downstream of valve devices 19, 20, and a pressure measuring device 22 is provided in turn upstream of the additional throttle device 21 and downstream of the valve devices 19 and 20. The valve devices 19 and 20, in this case designed as 4/2 directional valves, can be supplied with a control pressure p_VS23, p_VS24, provided from the high-pressure area 34, through an electro-hydraulic actuator, in this case designed as a solenoid valve, against a spring device 25 or 26, in order to supply the positioning devices 2A, 3A, in accordance with the request, in the area of the piston chambers 12 and 13 or in the area of the piston chambers 14 and 15, as the case may be, with the hydraulic pressure p_sys of the high-pressure area 34, or to connect them to the low-pressure area 18.

Due to the fact that a single pressure measuring device 22 is provided for monitoring the position of the two piston elements 10 and 11, gates 35, 36 are provided between the valve devices 19 and 20 and a pressure limiting valve 33; these gates exclude any mutual effect of the actuating pistons 10 and 11 in the event of actuation.

Through the pressure measuring device 22, which comprises a simple pressure sensor or a pressure switch, an end position sensing of the positions of the piston elements 10, 11, or the operating states of the positive-locking shifting elements A and F corresponding with this, can be carried out. In addition, position sensing is ideally provided in the area of the hydraulic control unit, whereas all end positions of the piston elements 10 and 11 can be established by means of a single absolute pressure sensor in the manner described in greater detail below.

Between the two end positions of the piston elements 10 and 11, the piston chambers 12 and 13, or 14 and 15, as the case may be, are connected to each other through the throttle devices 16 and 17, depending on their position. The throttle devices 16 and 17 or the connections between the piston chambers 12 and 13, or 14 and 15, as the case may be, in the area of throttle devices 16 and 17, are then released by the piston elements 10 and 11 if the piston elements 10 and 11 are not in their end positions.

Thereby, through the throttle devices 16 and 17 in positions of the piston elements 10 and 11 between their end positions, a volume flow of hydraulic fluid originating from the piston chamber 12 or 13, or 14 or 15, as the case may be, which is connected to the high-pressure area 34 by the valve device 19 or 20, is led in the direction of the piston chamber 13 or 12, or 15 or 14, as the case may be, which is coupled to the low-pressure area 18, which in the present case is the transmission sump of the transmission device.

In the area of an additional throttle device presenting a stagnation gate, depending on the throttle cross-section of the additional throttle device 21, depending on the leakage flow streaming from the piston chamber 12 or 13, or 14 or 15, as the case may be, in the direction of the low-pressure area 18, a stagnation pressure p_sens builds up, which is calculated by measuring devices in the area of the pressure measuring device 22.

The response pressure p_DBV of the pressure limiting valve 33, which is arranged downstream of the valve devices 19 and 20 and upstream of the additional throttle device 21, lies above a predefined threshold value of the pressure measuring device 22, from which a malfunction in the area of the positioning device 2A or 3A is detected by the pressure measuring device 22. Based on the arrangement of the pressure limiting valve 33 upstream of the additional throttle device 21, during the actuation of the piston element 10 or 11, the pressure downstream of the valve devices 19 and 20 and upstream of the additional throttle device 21 increases at least to the response pressure p_DBV of the pressure limiting valve 33. After reaching the end position of the piston element 10 or 11, the volume flow of leakage in the area of the throttle device 16 or 17 is interrupted by the piston element 10 or 11 in the described manner, by which the hydraulic pressure p_sens upstream of the additional throttle device 21 can no longer reach the pressure level of the response pressure p_DBV of the pressure limiting valve 33. This results from the fact that the hydraulic system upstream of the valve devices 19 and 20 is vented through the additional throttle device 21 in the direction of the low-pressure area 18.

If the piston element 10 does not reach the desired end position, the volume flow of leakage remains large through the throttle device 16, and, in the area of the stagnation gate 21, leads to a pressure increase, until the pressure limiting valve 33 responds and is limited to the pressure p_sens in the system. Thereby, the pressure p_sens in the tank line featuring the additional throttle device 21 increases to a level that, in the area of the pressure measuring device 22, exceeds the predefined pressure threshold value, and the electronic transmission control unit is supplied with a signal that corresponds to a faulty piston position.

Figure 4:
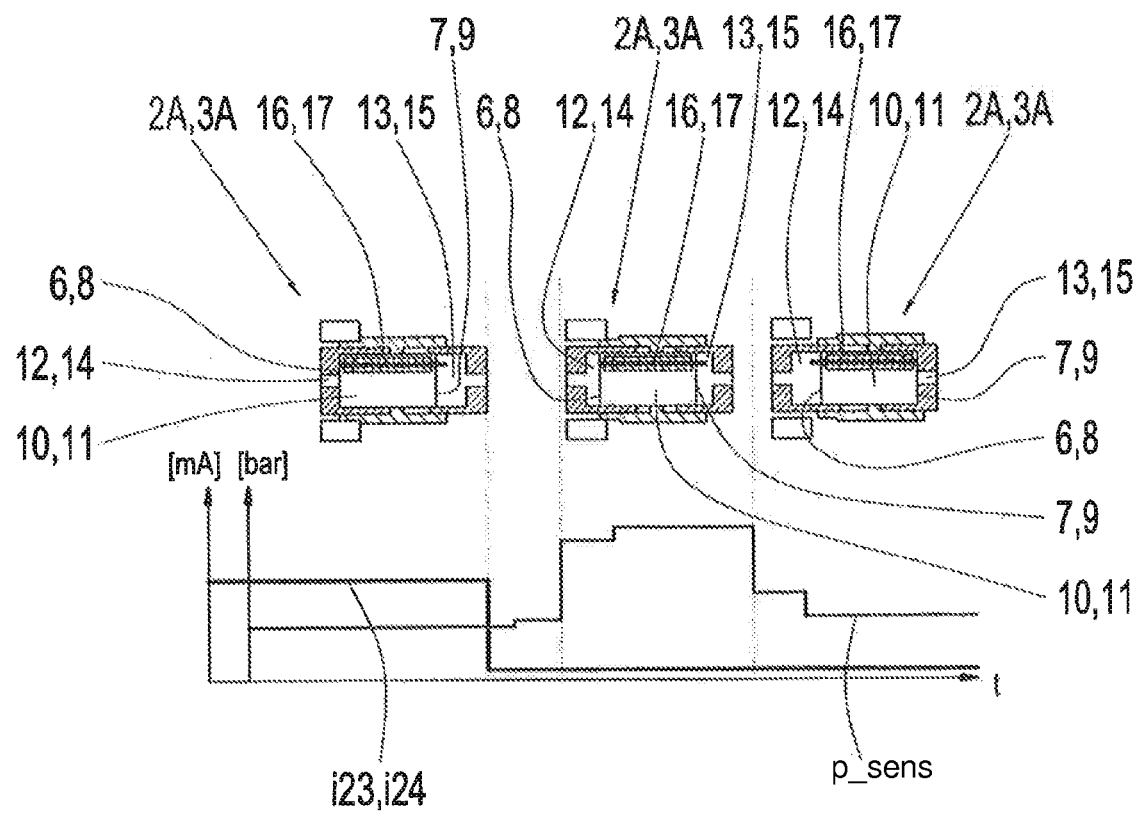
FIG. 4 a curve of a drive current of an electro-hydraulic pressure controller and a pressure signal through the time t corresponding to the operating pressure of a positive-locking shifting element of the transmission device in accordance with FIG. 1 and operating states, in each case corresponding to the two curves, of the positive-locking shifting element assigned to the electro-hydraulic pressure controller.

FIG. 4 shows a curve of actuating current i23 or i24 of the electro-hydraulic actuator 23 or 24 and a curve of the pressure p_sens through the time t. In addition, the positioning device 2A or 3A is shown in different operating states, which correspond to the curve of the actuating current i23 and i24 and the curve of the pressure signal p_sens that can be calculated in the area of the pressure measuring device.

Up to a point in time T1, the curve of the actuating current i23 and i24 of the electro-hydraulic actuator 23 or 24 features an essentially constant curve, at which the positioning device 2A or 3A is found in a first operating state, at which the piston element 10 or 11 is held by the applied actuating pressure in its first end position, in which the throttle device 16 or 17 is closed. Based on the closed operating state of the throttle device 16 or 17, no pressure is led from the positioning device 2A or 3A through the shifting element 19 or 20 in the direction of the additional throttle device 21 and thus of the low-pressure area 18 and pressure measuring device 22. As a result, pressure prevailing in the area of the pressure measuring device 22, essentially in the low-pressure area, which essentially corresponds to the ambient pressure of the transmission device 1, is calculated. At the point in time T1, a request is issued for a change in operating state in the area of the shifting element A or F, in order to transfer the positive-locking shifting element A and F from an open operating state to a closed operating state, or from a closed operating state to an open operating state. This depends on whether the open operating state or the closed operating state of the positive-locking shifting element A or F corresponds to the operating state of the positioning device 2A or 3A represented prior to the point in time T1.

The following description is based on the assumption that the first end position of the piston element 10 or 11 existing prior to the point in time T1 corresponds to a closed operating state of the positive-locking shifting element A or F, and the request for a change in operating state of the positive-locking shifting element A or F existing at the point in time T1 results in a request to open the positive-locking shifting element A or F.

The request for opening the positive-locking shifting element A or F existing at the point in time T1 leads to the fact that the actuating current i23 and i24 of electro-hydraulic actuator 23 or 24 is abruptly reduced to zero, which lead to the fact that the valve device 19 or 20 passes into a shifting position corresponding to it, at which the piston chamber 12 or 14 of the positioning device 2A or 3A is supplied with high pressure or system pressure p_sys. As a result, the piston element 10 or 11 is initially moved from a first end position into an intermediate position between its first end position and its second end position presented after the point in time T1, at which the throttle device 16 or 17 is open. Then, the volume of hydraulic fluid flows through the throttle device 16 or 17 from the piston chamber 12 in the direction of the piston chamber 13 or from the piston chamber 14 in the direction of the piston chamber 15, which leads to a pressure increase downstream of the valve device 19 or 20 and upstream of the additional throttle device 21. This pressure increase is determined from a point in time T2, which chronologically follows the point in time T1. The pressure increase corresponds to the jump in the curve of the pressure p_sens at the point in time T2. Therefore, the events taking place at the points in time T1 and T2 are spaced from one another, since the abrupt drop in the actuating current i23 or i24, based on hydraulic delays in the area of the hydraulic actuating system 1A, after some time, has the consequence of a change in the pressure p_sens calculated in the area of the pressure measuring device 22.

At a point in time T3, based on the applied system pressure p_sys, the piston element 10 or 11 essentially reaches its second end position, which is shown above the curves i23 and i24 and p_sens after the point in time T3. Upon reaching the second end position of the piston element 10 or 11, the throttle device 16 or 17 is once again blocked by the piston element 10 or 11. At that point, there is no exchange of hydraulic fluid between the piston chambers 12 and 13, or 14 and 15, as the case may be, until the system pressure p_sys is in turn applied in the area of the piston chamber 13 or 15, and the throttle device 16 or 17 is once again released by the piston element 10 or 11.

At the point in time T3, the pressure p_sens initially abruptly drops to an intermediate value, and essentially remains at this level upon a point in time T4. This results from the fact that the pressure upstream of the additional throttle device 21 is relieved only with increasing time t and, at the point in time T4, in turn abruptly returns to the level at the point in time T1.

In order to check whether the change in operating state requested at the point in time T1 in the area of the positive-locking shifting element A or F has actually started, and, at the point in time T3, has also reached the requested extent of the requested operating state, the pressure p_sens calculated in the area of the pressure measuring device 22 is permanently monitored upon the presence of a request for a change in operating state.

Figure 5:
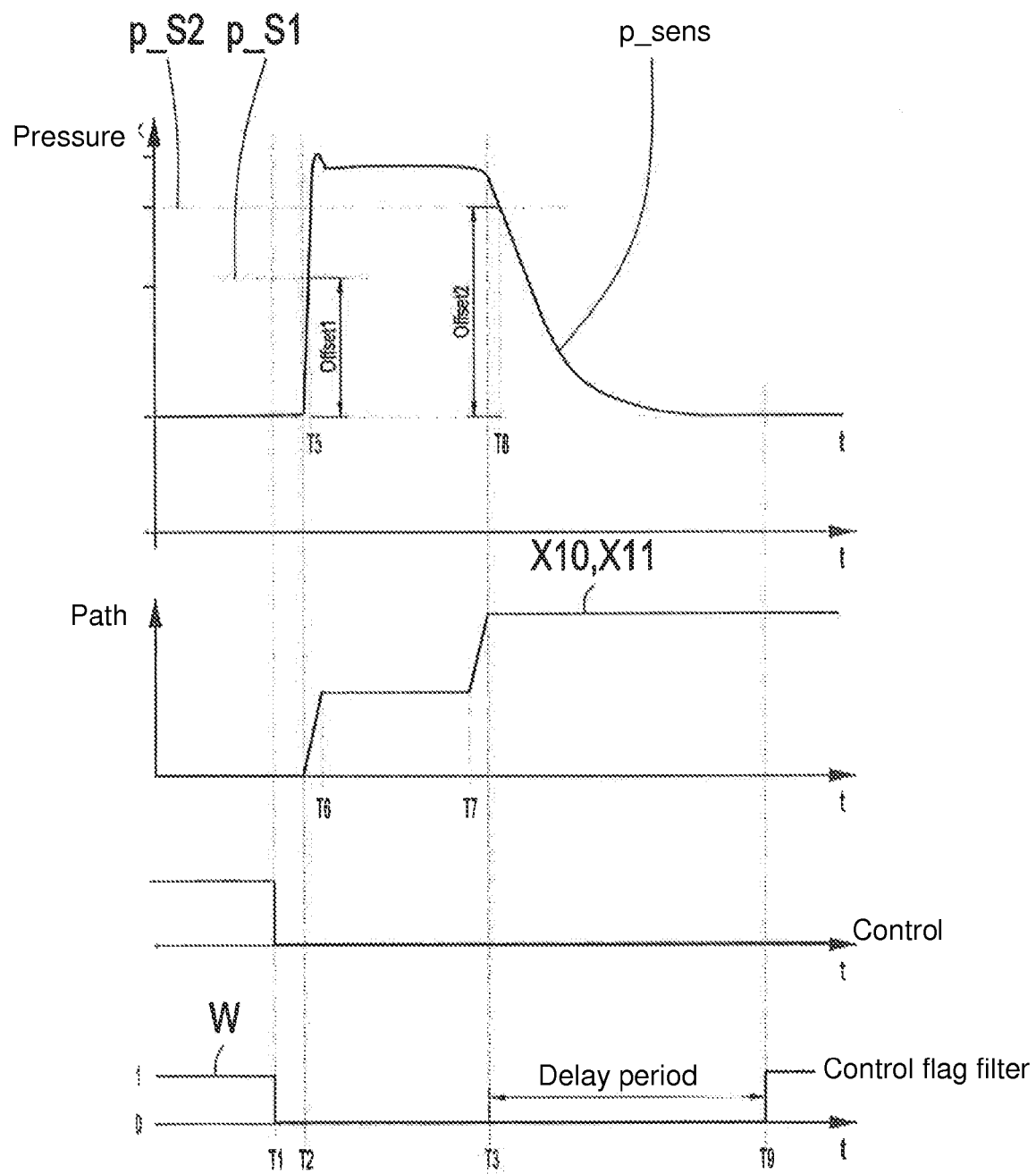
FIG. 5 a curve of the pressure signal and a curve of a factorized threshold value through the time t after a restart of a vehicle designed with the transmission device, whereas the curves are adjusted during an advantageous variation of the method in accordance with an exemplary embodiment of the invention.

A curve of a pressure signal adjusted during a change in operating state of the positive-locking shifting element A or F depending on the applied operating pressure p_sys in the area of the pressure measuring device 22, or the sensor pressure p_sens, is shown in FIG. 5, in addition to the additional curves of the various operating dimensions of the transmission device 1, through the time t. At the point in time T1, at which the request for a change in operating state in the area of the positive-locking shifting element A or F is in turn issued, the curve of the actuating current i23 and i24 of the electro-hydraulic actuator 23 or 24 abruptly drops to the extent described in FIG. 4, from an upper value to a lower value. As a result, at the point in time T2, the sensor pressure p_sens increases with large gradients. At a point in time T5, the sensor pressure p_sens corresponding to the operating pressure p_sys exceeds a threshold value pS1 of the sensor pressure p_sens.

Upon exceeding the threshold value pS1 of the sensor pressure p_sens in the area of the positive-locking shifting element A or F, the start of the requested change in operating state is detected, which results in a position movement of the piston element 10 or 11, whereas the position movement X10 or X11 of the piston element 10 or 11 is likewise shown in FIG. 5 through the time t. Thereby, the curve of the position movement X10 or X11 of the piston element 10 or 11 only represents an exemplary curve, with which the piston element 10 or 11 remains between the points in time T6 and T7 in a defined axial position, despite the applied operating pressure p_sys. This may be caused, for example, based on an operating pressure p_sys that is too small or friction forces that are too high between the piston element 10 or 11 and a cylindrical housing of the positioning device 2A or 3A.

At the point in time T7, the piston element 10 or 11 is shifted to an extent corresponding to the curve of the position path X10 or X11, increasingly in the direction of the second position, which the piston element 10 or 11 reaches in the described extent at the point in time T3. The sensor pressure p_sens in turn drops, based on the throttle device 16 or 17 that is then blocked, with large gradients. At a point in time T8, the sensor pressure p_sens is less than an additional threshold value pS2 of the sensor pressure p_sens, whereas the reaching of the requested operating state in the area of the positive-locking shifting element A or F is then established.

Since the pressure measuring device 22 is designed as a cost-effective absolute pressure sensor, the sensor pressure p_sens calculated in the area of the pressure measuring device 22 is the sum of the ambient pressure or pressure existing in the low-pressure area 18 and the relative amount of pressure applied from the operating pressure p_sys in the area of the positioning device 2A or 3A. For this reason, each of the threshold values pS1 and pS2 is determined based on the currently existing pressure in the low-pressure area 18 or the ambient pressure of the transmission device 1 and a pressure offset value, which is essentially constantly indicated for each comparable operating state of the transmission device, that is, for the same transmission temperatures and the same system pressures p_sys.

This approach leads to the fact that the determination of whether a request for a change in operating state has already started in the area of the positive-locking shifting element A or F, and whether the positive-locking shifting element A or F has reached the requested change in operating state takes place at comparable transmission temperatures and comparable operating pressures p_sys through varying pressure values in the low-pressure area 18 or at varying ambient pressures of the transmission device 1 at the different points in time T5 and T8. This means that, during a trip of a vehicle at sea level through the approach last described, the start of the change in operating state in the area of the positive-locking shifting element A or F is established at a point in time later than is the case with a trip of the vehicle in the high mountains, for example, at 3000 m of altitude. At the same time, weather-related fluctuations in atmospheric pressure also cause variations in the determination of the start of a change in operating state and in the determination of whether the requested operating state has been reached, which is undesirable however.

Variations in the ambient pressure of the transmission device 3 can deliver incorrect monitoring results, in particular in connection with component tolerances. In addition, based on the more accurate monitoring of the ambient pressure of the transmission device 3, the threshold values pS1 and pS2 are more accurately adjustable to the current operating state of the transmission device 1, and the transmission device 1 is operable with a higher degree of spontaneity, since lower security intervals are necessary when the respective start of a change in operating state and reaching the requested change in operating state are detected.

For this reason, the pressure in the low-pressure area 18 is calculated in the non-actuating operating state of the positive-locking shifting element A or F continuously or after pre-defined time intervals, and taken into account for the determination of threshold values pS1 and pS2. Thus, influences resulting from variations caused by elevation or weather in the pressure in the low-pressure area 18, or in the ambient pressure of the transmission device 1, are avoided in a simple manner.

In order not to distort the determination, essentially presenting a calibration of the control unit assigned to the hydraulic actuating system, of the pressure in the low-pressure area 18 through the actuation of the shifting element A or F, the determination of the pressure in the low-pressure area 18 or the ambient pressure of the transmission device 1 is interrupted upon the presence of a request for a change in operating state in the area of the positive-locking shifting element A or F. This is graphically presented by a jump of a status line W from the value 1 to a value of 0 at the point in time T1. As long the status line W is at the value 0, for the determination of threshold values pS1 and pS2, the pressure in the low-pressure area 18 last determined prior to the point in time T1, or the last determined value of the ambient pressure of the transmission device 1, is used. Upon the presence of a request for a change in operating state, the pressure of the low-pressure area 18 measured and filtered in the area of the pressure measuring device 22 is held or frozen in the area of the positive-locking shifting element A or F upon the start of an electrical control of the positive-locking shifting element A or F corresponding with it, and used for the approach described above.

The determination of the pressure in the low-pressure area 18 by the pressure measuring device 22 restarts only if the movement of the positive-locking shifting element A or F or the change in operating state of the positive-locking shifting element A or F is complete and is found in a secure end position.

In order to carry out the determination of the pressure in the area of the pressure measuring device 22 to a desired extent, the status line W is led back to the value 1 only at a point in time T9, and the determination of pressure in the low-pressure area 18 by the pressure measuring device 22 is resumed only at a point in time T9, at which the hydraulic actuating system 1A is in an operating state or a resting state necessary for this. For this purpose, after the point in time T3, there is a wait for a defined delay period, which extends until the point in time T9, in order to ensure that the actual pressure value in the low-pressure area 18 is determined by the pressure measuring device 22.

Since, in the present case, the calculation of the pressure in the low-pressure area 18 upon an electric actuation of the positive-locking shifting element A or F is omitted, the option exists of, in a simple manner, monitoring an influence impairing the determination of the pressure in the low-pressure area 18, for example an actuation of an additional shifting element of the transmission device 1 that is to be filled or emptied, or a changing system pressure p_sys, through electrical control signals corresponding to it, and, if necessary, interrupting a calculation of the pressure in the low-pressure area 18.

Since long downtimes of a vehicle, during which the supply of hydraulic pressure of the transmission device 1 is interrupted, cause accumulations of air in the area of the hydraulic actuating system 1A, upon a change in operating state in the area of the positive-locking shifting element A or F, the sensor pressure p_sens does not reach the usual value as long as the accumulations of air are not pumped out of the hydraulic actuating system 1A. For this reason, the pressure offset values taken into consideration for the determination of the threshold values pS1 and pS2 are factorized in the manner described in more detail below at FIG. 6, in order to be able to determine the start of a requested change in operating state and the reaching of the requested change in operating state also upon the presence of accumulations of air. The factorization is carried out depending on a defined number of successive actuations of the positive-locking shifting element A or F in the current driving cycle.

Figure 6:
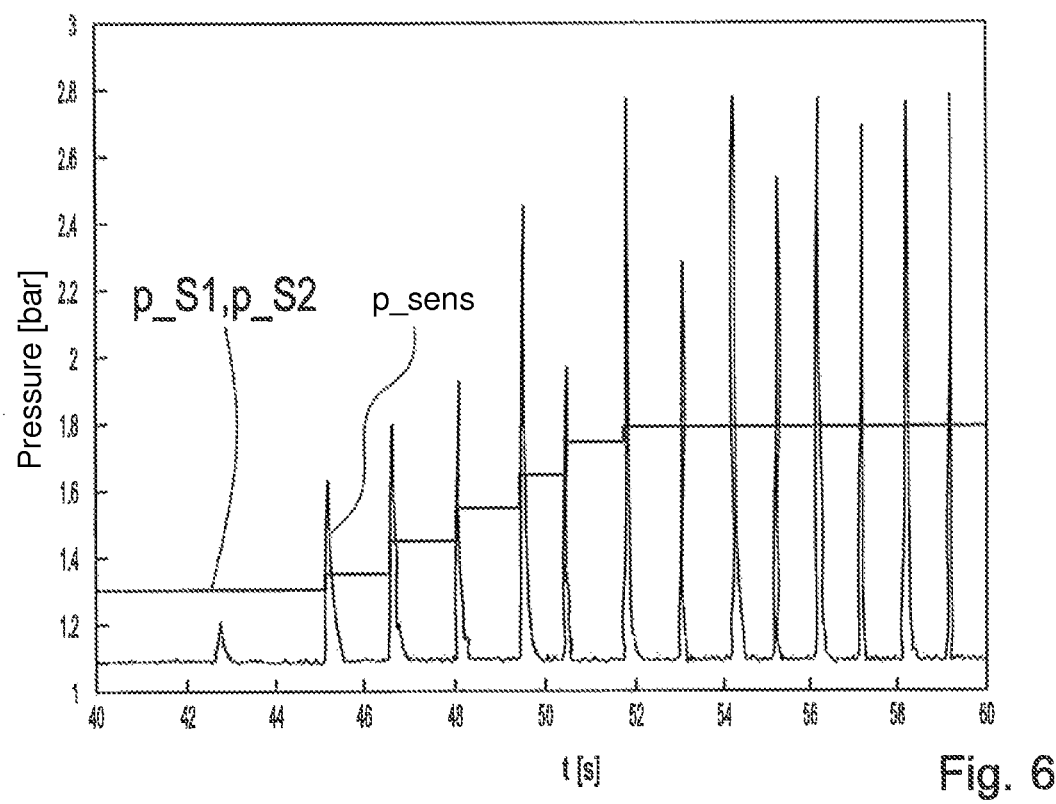
FIG. 6 shows a real curve of the sensor pressure p_sens through the time t after a restart of a vehicle designed with the transmission device after an accompanying renewed hydraulic supply of the hydraulic actuating system.

FIG. 6 shows a real curve of the sensor pressure p_sens through the time t after a restart of a vehicle designed with the transmission device 1 after an accompanying renewed hydraulic supply of the hydraulic actuating system 1A, which is adjusted during several consecutive actuations of the positive-locking shifting element A or F. Thereby, the curve of the sensor pressure p_sens in FIG. 6 corresponds to the unfiltered raw signal of the sensor pressure p_sens calculated by the pressure measuring device 22. In addition, a curve of the threshold values pS1 and pS2 equally specified depending on the present application through the time t is represented, whereas, upon the first actuation at a point in time T=45 s, the threshold values pS1 and pS2 are multiplied by a factor of less than 1, and are thus factorized.

Therefore, the factorization of the threshold values pS1 and pS2 is provided, since accumulations of air trapped in the hydraulic actuating system 1A lead to the fact that, upon the actuation of the positive-locking shifting element A or F, the sensor pressure p_sens does not reach the usual value until the air is pumped out from the hydraulic actuating system 1A. Since, in a known manner, several successive actuations of the positive-locking shifting element A or F or also of the additional shifting elements B, C, D, E increasingly pump such accumulations of air from the hydraulic actuating system 1A, with every actuation of the shifting element A or F or also the additional shifting elements B to E, the threshold values pS1 and pS2 are multiplied by a higher factor, whereas, in the present case, the threshold values pS1 and pS2 are multiplied by a factor equal to one after the sixth actuation of the shifting element A or F, and taken into consideration for the determination of whether the change in operating state of the shifting element A or F has taken place and been completed.

Thereby, the number of changes in operating state of the positive-locking shifting element A or F or the additional shifting elements B to E originating from the start value of the factor less than one varies until reaching the value of the factor equal to 1, if the hydraulic actuating system 1A is essentially free of accumulations of air already after a small number of multiple sequential actuations of a shifting element, or only after a larger number of actuations of one of the shifting elements.

Modifications and variations can be made to the embodiments illustrated or described herein without departing from the scope and spirit of the invention as set forth in the appended claims.

The invention claimed is:

1. Method for operating a transmission device, in particular a 9-speed transmission, which is transferable into different operating states through the actuation of shifting elements, whereas at least one of the shifting elements is designed as a positive-locking shifting element, which is supplied with operating pressure for presenting a defined operating state of the transmission device and is thereby transferred from a closed into an open operating state, or from an open into a closed operating state, the method comprising:

determining, through a sensor device upstream of a throttle device, which is connected to a transmission area essentially featuring ambient pressure, a value of a pressure signal corresponding to the operating pressure; and determining, upon exceeding a threshold value of the pressure signal, currently in the area of the positive-locking shifting element, a change in operating state; and establishing, upon falling short of an additional threshold value of the pressure signal, the reaching of the requested operating state, characterized in that, in a non-actuated operating state of the positive-locking shifting element the pressure in the transmission area is established by the sensor device and, upon the presence of a request for a change in operating state in the area of the positive-locking shifting element, the threshold value and the additional threshold value are determined from the sum of the pressure calculated in the transmission area prior to the presence of the request for the change in operating state and a pressure offset value.

2. A method for operating an automatic transmission having a plurality of shifting elements with at least one positive-locking shifting element, comprising:

initiating a shift of a positive-locking shifting element of the at least one positive-locking shifting element;

supplying a positioning device of the positive-locking shifting element with a fluid at an operating pressure during said step of shifting;

measuring a pressure of the fluid downstream of the positioning device of the positive-locking shifting element with a pressure sensor positioned upstream of a throttling device that is connected to a transmission area at essentially ambient pressure;

determining that the positive-locking shifting element of the at least one positive-locking shifting element is shifting if pressure of the fluid downstream of the positioning device of the positive-locking shifting element from said step of measuring exceeds a first threshold value; and establishing that the shift of the positive-locking shifting element of the at least one positive-locking shifting element is complete if the pressure of the fluid downstream of the positioning device of the positive-locking shifting element from said step of measuring drops below a second threshold value after said step of determining, wherein the first and second threshold values each correspond to a sum of the pressure of the fluid downstream of the positioning device of the positive-locking shifting element prior said step of initiating and a respective pressure offset value.

3. The method of claim 2, wherein the second threshold value is greater than the pressure offset value of the first threshold value.

4. The method of claim 2, wherein the pressure offset value of the first threshold value is different than the pressure offset value of the second threshold value.

5. The method of claim 2, wherein the pressure offset value of the first threshold value is equal to the pressure offset value of the second threshold value.

6. The method of claim 2, further comprising recalculating the first and second threshold values after a predetermined period of time from said step of establishing has elapsed.

7. The method of claim 6, wherein the positive-locking shifting element of the at least one positive-locking shifting element is open at said step of recalculating.

8. The method of claim 2, wherein the pressure offset value of the first threshold value and the pressure offset value of the second threshold value vary with respect to a temperature of the automatic transmission.

9. The method of claim 2, further comprising:
   deactivating the automatic transmission;
   restarting the automatic transmission; and
   repeating said steps of initiating, supplying, measuring, determining and establishing after said step of restarting,
   the pressure offset values of the first and second threshold values multiplied by a factor of less than one for said step of repeating.

10. The method of claim 9, wherein the factor originates at a start valve of less than one and gradually increases by one value with each shift of the positive-locking shifting element of the at least one positive-locking shifting element.

11. The method of claim 10, wherein the factor is increased up to a value of one.

* * * * *